Aug. 19, 1969     P. S. BUCKLAND     3,462,328

METHOD OF MAKING VEHICLE TIRE TREAD

Filed June 7, 1965

*INVENTOR.*
PAUL S. BUCKLAND

BY J.B. Holden

ATTORNEY

United States Patent Office 3,462,328
Patented Aug. 19, 1969

3,462,328
METHOD OF MAKING VEHICLE TIRE TREAD
Paul S. Buckland, Akron, Ohio, assignor to The Goodyear Tire & Rubber Company, Akron, Ohio, a corporation of Ohio
Filed June 7, 1965, Ser. No. 461,806
Int. Cl. B60c *11/14;* B32b *27/40*
U.S. Cl. 156—114                        11 Claims

ABSTRACT OF THE DISCLOSURE

A method of making a vehicle tire tread comprising applying a coating of a liquid polyurethane reaction mixture to the surface of the recessed portion of an elastomeric tire tread and curing the said polyurethane reaction mixture to form an integral composite structure.

---

This invention relates to a method of making a composite structure by applying a curable liquid reaction mixture to the recessed portions of a polyolefin surface or substrate having recessed portions and at least partially curing the reaction mixture.

This invention in its broad aspects relates to a method of making a vehicle tire tread by depositing a polyurethane reaction mixture within at least a part of the recessed portions of an elastomeric tire tread as well as to mats and other decorative articles. Heretofore, the exposed portion of a cured rubber vehicle tire tread has generally comprised, for example, a continuous composition of such polymers as butadienestyrene, isoprene, butadiene or natural rubber, or a mixture of two or more of these. If it were desired that an inlay of a composition different than that of the rubber tread be applied to the recessed portion of the tread in order to alter its wearing and traction characteristics, special techniques would normally be required. These techniques include manual or mechanical positioning of the inlay material within the recessed area of the tread. Additional bonding and shaping steps are usually necessary, such as pressure molding and curing in molds under elevated temperature and pressure.

An object of this invention is to provide a method of making a surface having recessed portions with an at least partially cured polymeric reaction material occupying the recessed portions of the matrix without utilizing expensive and time consuming manual and mechanical positioning and molding techniques.

A further object of this invention is to provide a method of making a vehicle tire tread having an exposed outer portion of an elastomeric surface having recessed portions and a polyurethane polymer of desired wearing and traction characteristics occupying at least a part of the recessed portions of the tread.

These and other objects may be accomplished by applying at least one coating of a liquid polyurethane reaction mixture to the recessed portion of a rubber matrix and at least partially curing the reaction mixture to obtain an integral composition.

Further objects and advantages of the invention will be apparent by reference to the accompanying drawings wherein.

Figure 1:
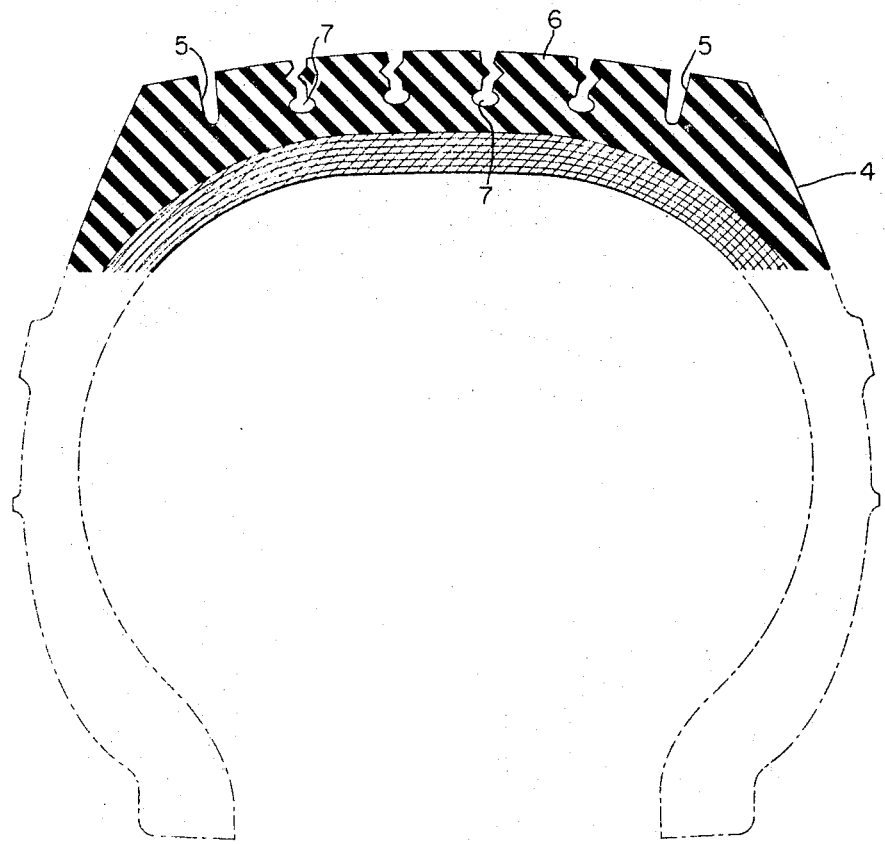
FIG 1 is a cross-sectional view of a vehicle tire.

Referring to FIG. 1, a vehicle tire 4 is illustrated in which relatively straight-sided grooves 5 are shown in the tread 6, as well as grooves in which their inner portions 7 are enlarged.

Figure 2:
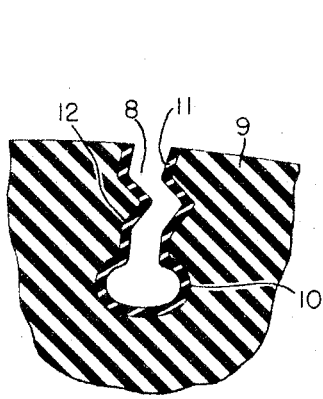
FIG. 2 is an enlargement of a groove or recessed portion of the cross-sectional view of the tire of FIG. 1 showing a coating of polyurethane on the inner surface of the groove.

As shown in FIG. 2, a groove 8 in the tread 9 with its inner portion 10 enlarged has a coating of polyurethane 11 on its inner surface. The enlarged portion as well as the constricted portion 12 is designed to structurally assist in affixing the polyurethane coating to the inner portion of the groove.

Figure 3:
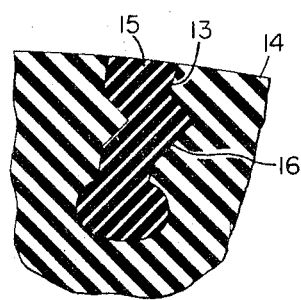
FIG. 3 is an enlargement of a groove or recessed portion of the cross-sectional view of the tire of FIG. 1 showing the groove filled with polyurethane.

As further shown in FIG. 3, a groove 13 in the tread 14 with its inner portion enlarged has been filled with polyurethane 15. The enlarged portion of this groove, as well as its constricted portion 16, as in the case of the groove shown in FIG. 2, is designed to aid in retaining the polyurethane in the groove. By applying a liquid polyurethane reaction mixture to the groove and then allowing it to cure within the groove, a method of making an inlay in the tread is provided which does not necessitate mechanically positioning and forcing a preshaped inlay of desired hardness characteristics into said groove.

In a preferred embodiment, a vehicle tire tread in this invention may be made by first preparing an elastomeric vehicle tire tread having recessed portions to increase the adhesion characteristics of the elastomer to the polyurethane. Such preparation may be accomplished by methods known to those skilled in the art.

In a preferred method, a vehicle tire having a rubber tread may be prepared by cleaning with a suitable solvent cleaner, such as carbon tetrachloride, toluene, benzene, heptane, or a mixture of two or more of such cleaners, or the tread may be subjected to a tractionizing treatment or light buffing to abrade away approximately one sixty-fourth to one thirty-second of an inch of the tread surface. Also a bonding cement may be applied to the recessed portion of the tread to enhance the adhesion characteristics. The cement generally is allowed to dry or cure until it is almost tack-free. A liquid polyurethane reaction mixture is then applied, preferably by spraying the mixture onto the surface of the bonding cement within the recessed portion of the tread. The tread also may be dipped into the liquid reaction mixture for this purpose instead of using the spraying technique, or the mixture may be poured into the desired recessed portion of the tread. Any excess reaction mixture and bonding cement is removed from the outer portion of the rubber tread. The coating of the reaction mixture is then allowed to at least partially cure, thus forming an integral composite structure. Additional coatings of the reaction mixture subsequently may be applied to the recessed portion for the purpose of building up the thickness of the overall coating as may be desired.

The rate processing a tire tread by this method may be increased by placing the tread in a hot air oven and allowing the reaction mixture to at least partially cure at about 40 to 125° C. for about five minutes to five or more hours depending upon the nature of the reaction mixture, thickness of the coating, and degree of curing desired. Other heat sources, such as a heat lamp, may also be employed.

The thickness of each coating of the reaction material may be regulated by the configuration of a spraying nozzle, the distance of the spraying nozzle from a tire tread, rate of application, the composition of the liquid reaction material, and rate of passing the sprayer over the tread. In accomplishing this result, rotating the tire may be of assistance.

Various tractionizing materials may be added to the reaction mixture either before or after the coating has been applied to the tread. Preferably, such materials may be added while the coating is still sticky. Representative traction materials are shredded wire, wire coils, fabric including glass, wool, sand, nut shells, sawdust, metal shavings and grit, Carborundum, cork, tungsten carbide, and the like. These materials are used to vary the coefficient of friction of the polyurethane polymer coating to give strength, or for decorative purposes.

A suitable reaction mixture may comprise a reactive hydrogen-containing polymeric material, and an organic polyisocyanate. Sufficient crosslinking agent to react with the free polyisocyanate also may be added to the reaction mixture.

Sufficient solvent may be added to yield a sprayable mixture or solution. Noramlly, the coating polyurethane mixture may contain from about 40 to 65 percent solids, although a higher or lower concentration of solids may be used. If the solids concentration is low, the individual coatings will tend to be thinner and, generally, a larger amount of the solvent will have to be removed during the curing process. A solids concentration of 55 percent or higher, generally, is desired unless a uniform coating of the recessed portion of the tire tread is prevented by the higher solids concentration or the reaction mixture possesses too great a tendency to flow.

The reactive hydrogen-containing polymeric material may be selected from one of the groups consisting of polyester polyols, polyesteramides, polyether polyols, polygrycols, hydroxyl-terminated polymeric hydrocarbons, and polyalkylene ether glycols. Such reactive hydrogen-containing polymeric materials should have a molecular weight between about 700 and about 5000 and, preferably, between about 1000 and about 3000 in order that the resulting coating may have sufficient elasticity. Generally, polyesters are preferred over polyethers if greater strength and solvent resistance are desired.

Representative examples of useful polyesters for this invention are the condensation products of low molecular weight polyols, such as the glycols with an organic polycarboxylic acid or anhydride. Representative glycols are ethylene, propylene, butylene, pentylene, decamethylene, etc. Representative examples of the organic dicarboxylic acids and anhydrides are succinic, glutaric, adipic, phthalic, terephthalic, isophthalic, suberic, sebacic, pimelic, and azelaic. In addition, one to twenty percent, or more, of certain tri- or higher functional polyols and acids may be used to produce a small amount of branching in the polymeric material, if desired. Castor oil may also be used in small amounts.

The usable organic polyisocyanates include a relatively wide variety of organic diisocyanates or mixtures thereof which may also include higher functional polyisocyanates. The organic diisocyanates may be aromatic, aliphatic, and cycloaliphatic or combinations of these types.

Representative organic diisocyanates include toluene-2,4-diisocyanate, mixtures of toluene-2,4- and -2,6-diisocyanates; m-phenylene diisocyanate; 4-chloro-1,3-phenylene diisocyanate; 4',4'-biphenylene diisocyanate; 1,5-naphthylene diisocyanate; 1,4-tetramethylene diisocyanate; 1,6-hexamethylene diisocyanate; 1,10-decamethylene diisocyanate; 1,4-cyclohexylene diisocyanate; 4,4'-methyl-one-bis (cyclohexylisocyanate) and 1,5-tetrahydronaphthylene diisocyanate. For purposes of the present invention, the toluene-diisocyanates, diphenylmethane-4,4' - diisocyanate and 3,3'-dimethyl-4,4'-bisphenylene diisocyanate are preferred and these respective diisocyanates are sometimes hereinafter referred to for convenience as TDI, MDI and TODI.

In the preparation of the isocyanate-terminated polymers of this invention, a molar excess of the reactive hydrogen-containing polymeric material, such as a polymeric polyol which may be a polyalkylene ether glycol or polyester glycol, is first reacted with an organic diisocyanate to prepare a polyurethane glycol or polyol. The polyurethane glycol or polyol is usually dissolved or dispersed in a suitable solvent hereinafter described and then may be mixed with a crosslinking agent which is, preferably, dissolved or dispersed in a suitable solvent. This solution or dispersion may then be reacted with a molar excess of an organic diisocyanate to produce an isocyanate-terminated polymer.

As an alternate method, the polyalkylene ether glycol or polyol may be directly reacted with a molar excess of an organic diisocyanate and crosslinking agent.

In the preparation of these polymers, overall ratios of organic diisocyanate to the polymeric polyol of between 1.1:1 and 12:1 should be used at temperatures ranging from about 20° C. to about 150° C. The preferred ratios are about 1.2:1 to 2:1.

The crosslinking agents useful in this invention are used in the amount of about 0.5 to 0.9 and, preferably, about 0.6 to 0.8 moles per mole of excess organic polyisocyanate over that equivalent to the reactive hydrogen-containing polymeric material.

The crosslinking agent may be a material containing two or more reactive groups, e.g., glycerol or triethanolamine, but bifunctional materials are preferred. In general, the bifunctional materials yield products having superior spraying properties. Representative classes of compounds suitable for use as crosslinking agents are the glycols, the diamines having primary or secondary amino groups, the dicarboxylic acids, the hydroxy amines, the hydroxy-carboxylic acids and the amino-carboxylic acids. Representative examples of suitable compounds belonging to these classes are ethylene glycol; 1,3-propanediol; 1,4-butane-diol; ethylene diamine; trimethylene diamine; tetramethylene diamine; m-phenylene diamine; o- and m-dichlorobenzidine; 2,5-dichlorophenylene diamine; 3,3'-dichloro-4,4'-diamine-diphenyl methane; dianisidine; 4,4'-diamino-diphenyl-methane; naphthylene diamines; tolylene-2,4-diamine; p-aminobenzyl aniline; o- or p-aminodiphenyl-amine; 2-aminoethyl alcohol; 2-amino-1-naphthol; m-aminophenyl; glycolic acid; alpha-hydroxy propionic acid; amino acetic acid and amino benzoic acid. The preferred glycol crosslinking agent is butane diol, and the chloroamines, such as orthodichlorobenzidine and methylene bis orthochloroaniline are the preferred amine crosslinking agents. The respective chloroamines above are sometimes referred to herein for convenience as ODCB and MOCA.

A method for selecting the diisocyanates and diamines which form sprayable liquid reaction mixtures that can be mixed and used with a single container type spray gun is the boiling methylene chloride turbidity test. By this method 0.2 to 0.5 molar solutions of the diisocyanate and diamine are made with methylene chloride. The respective methylene chloride solutions of diisocyanate and diamine are raised to the boiling temperature and mixed. If a turbidity develops inside of 15 to 30 seconds, this combination of diisocyanate and diamine will not yield a reaction mixture which can be sprayed under normal conditions. Thus, special spray conditions are required, for instance, very low temperature or a spray gun containing a mixing head must be used. On the other hand, those mixtures of diisocyanate and diamine which do not produce a turbidity inside of about 15 to 50 seconds can be sprayed with normal spray conditions.

Some combinations especially well suited for use in this invention are:

| | |
|---|---|
| TDI—MOCA | TODI—ODCB |
| TDI—ODCB | TODI—APS |
| TDI—APS [1] | MDI—MOCA |
| TODI—MOCA | MDI—ODCB |

Naphthalene diisocyanate—MOCA.
Naphthalene diisocyanate—ODCB.
Naphthalene diisocyanate—APS.
4,4'-diphenyl diisocyanate—MOCA.
4,4'-diphenyl diisocyanate—ODCB.
4,4'-diphenyl diisocyanate—APS.

[1] APS is bis(3,3'-amino phenyl) sulfone.

Any of the non-reactive solvents normally used in making paints which are suitable for spraying may be used in this invention. Representative examples of these are benzene, toluene, the paraffinic naphthas, the naphthenic naphthas, the aromatic naphthas, ethyl formate, propyl formate, butyl formate, amyl formate, ethyl acetate, propyl acetate, methyl acetate, butyl acetate, amyl acetate, acetone, methyl ethyl ketone, diethyl ketone, methyl isoamyl ketone, Cellosolve acetate, Cellosolve propylate, Cellosolve acetate butyrate, dioxane, lower nitraparaffins, etc. Mixtures of certain solvents in particular amounts may be desirable to obtain satisfactory spreading properties and evaporation rates when the polyurethane spray composition is applied to a surface. This is especially true where very volatile solvents, such as benzene and acetone are used.

Also, it is desirable to add to the spray composition certain pigments and other additives, such as surface-active agents, leveling agents, for instance, cellulose acetate butyrate, and other additives well known to the spray-coating art. In particular, it is desirable to add about 0.5 to 5 parts and, preferably, about 1 to 2 parts of a pigment on a hundred parts of prepolymer basis to give the inlay the desired color characteristics.

Submicroscopic pyrogenic silica, such as prepared in a hot gaseous environment by the vapor phase hydrolysis of silicon tetrachloride and available from Godfrey L. Cabot, Inc. under the trademark Cab-O-Sil is especially useful as a leveling agent in the sprayable polyurethane compositions when used in about 0.1 to 10 parts per 100 parts of solids in the solution. The preferred amount in about 0.5 to about 4 parts as the amount of solvent needed to give a sprayable viscosity is not materially changed. Also, this range of pyrogenic silica gives good thixotropic properties to the resulting sprayable composition.

In the broader embodiment of this invention, the liquid polyurethane reaction mixture may be applied to surfaces having recessed portions other than vehicle tire treads, and then allowed to cure. The flexibility of such surfaces may be more or less than that generally associated with a tire tread. The application of the liquid reaction mixture to the recessed portion of such surfaces may be particularly advantageous where varying wearing characteristics are desired in a composite structure. Further advantages of this method are also apparent. For example, by this method an inlay may be formed within the recessed portions of the structure without requiring mechanical positioning or without forcing a preshaped inlay of desired wearing characteristics into the recessed portion.

The polyolefins used for the substrates having grooved or recessed portions either inherently or formed by a mold member in this invention may be considered broadly as polymers of an alpha olefin having less than 10 carbon atoms. These alpha olefins include, specifically, ethylene, propylene, the butylenes, the amylenes, the hexylenes, the octylenes, the nonylenes, and decamethylenes. The 3 to 10 carbon atom dienes, such as butadiene and isoprene are representative of other alpha olefins. Elastomers, in general, are contemplated as being useful for providing the structures used in this invention. Some of the representative commercial rubbers or elastomers useful in this invention are natural rubber, butadiene-styrene copolymers, butadiene-acrylonitrile copolymers, polyisoprene, polybutadiene, copolymers of isoprene-butadiene, polychloroprene, butyl rubber, ethylene-butadiene copolymers, ethylene-propylene copolymers, and ethylene-propylene terpolymers. Representative plastic materials are polyvinyl chloride, polyethylene and polypropylene.

Those skilled in the cement art appreciate that the bonding cements which may be used result in various degrees of adhesive or bonding strength depending on the rubber composition of the tire tread. With the cold rubber butadiene-styrene compositions, a suitable cement comprises about 150 parts of an epoxy resin, such as Shell's Epon 820 or 828, about 50 parts cyclohexanone and about 400 parts of methyl ethyl ketone. Another cement which gives good results with tire treads made from natural rubber, the stereo-specific synthetic natural rubbers, such as cispolyisoprene and cis-polybutadiene, is a 10 pecent by weight dispersion of a polychloroprene in a mixture of about 60 percent by weight of toluene and about 40 percent by weight of methyl ethyl ketone where each hundred parts of polychloroprene has been compounded with about 4 to 5 parts of either magnesium oxide or zinc oxide, two parts of an amine-type antioxidant, such as phenyl beta naphthylamine 8–10 parts of rosin oil. Also, it is usually desirable to use an accelerator with this cement. Suitable accelerators are thio carboaniline and the thioamine class of accelerators, such as duPont's NA33. Also, it has been found desirablte sometimes to use about 30 parts of a carbon black, such as channel black per hundred parts of polychloroprene. Other cements, such as those normally used in recapping can be used especially where they have been fortified by the addition of about 5 to 20 percent per weight of a polyisocyanate. A preferred polyisocyanate for this use is a mixed polyisocyanate obtained by phosgenation of an aldehydearomatic amine reaction product. Such products are sometimes referred to as polyarylene polyisocyanates or mixtures thereof.

Illustrative examples are set forth to further exemplify the objects and advantages of this invention. However, it should be understood that the examples are set forth for illustrative and not for limitative purposes.

EXAMPLE I

A pneumatic butadiene-styrene tire was prepared by first cleaning the tread with toluene. The recessed portion of the tread was then coated with a polychloroprene cement. The excess cement adhering to the outer portion of the tread was removed. The cement was allowed to dry until at least tack-free. A coating of a liquid polyurethane reaction mixture to which Carborundum powder may be added is sprayed onto the cement within the recessed portion of the tread. Any excess polyurethane reaction mixture adhering to the outer portion of the rubber tread is removed by wiping the tread with a doctor knife. A squeegee roll could also be used for this purpose. The polyurethane reaction mixture is permitted at least to partially cure. An air heating oven or heat lamps may be utilized to increase the rate of cure. Additional and successive coats of the polyurethane mixture may be applied in a similar way to give the polyurethane the desired thickness. When desired thickness of polyurethane reaction mixture has been applied, the tire may be placed in an air oven at 250° F. for several hours to complete the curing of the reaction mixture. A suitable polyurethane liquid reaction mixture for use in this example was prepared by first reacting two moles of toluene diisocyanate with one mole of a polyester prepared by the condensation of adipic acid with an excess of a mixture consisting of 80 percent by weight ethylene glycol and 20 percent by weight propylene glycol. This prepolymer was used to prepare a black masterbatch by ball milling 1250 parts of the prepolymer with 375 parts Cellosolve acetate, 125 parts carbon black and 375 parts of methyl ethyl ketone. The ball milling should be continued until a uniform suspension is obtained. Component one of the spray mixture may be formed by mixing 165 parts of this black masterbatch with a mixture consisting of 1500 parts of the prepolymer, 450 parts of Cellosolve acetate, 450 parts of methyl ethyl ketone and 72 parts of a solution of Cellulose acetate butyrate containing 10 percent by weight of a mixture containing 50 percent xylene and 50 percent methyl Cellosolve acetate. Component two of the sprayable mixture comprises 153 parts of methyl ethyl ketone. Components one and two are then mixed together to form a sprayable liquid reaction mixture just prior to applying the spray coat to the rubber tire tread. The liquid reaction mixture will normally remain sprayable for at least one hour.

EXAMPLE II

A coating of a polyurethane reaction mixture is applied to the recessed portion of the tread of a butadienestyrene tire utilizing the same techniques illustrated in Example I. The formulations of Example I are also used with the exception that a polyalkylene ether glycol prepared by reacting a mixture of ethylene and propylene oxides with ethylene glycol is used in preparing the polyurethane reaction mixture.

EXAMPLE III

The recessed portion of a one-fourth inch thick sheet of a polyvinyl chloride plastisol matrix is coated, utilizing the technique illustrated in Example I, with a polyurethane reaction mixture of the composition shown in Example I to which decorative shiny metal flakes, instead of Carborundum, have been added. The polyvinyl chloride plastisol comprises 100 parts by weight of polyvinyl chloride and from about 25 to about 125 parts of dioctyl phthalate plasticizer.

While certain representative embodiments and details have been shown for the purpose of illustrating this invention, it will be apparent to those skilled in the art that various changes and modifications may be made therein without departing from the spirit or scope of the invention.

What is claimed is:

1. A method of making a vehicle tire tread comprising applying a coating of a liquid polyurethane reaction mixture to the surface of the recessed portion of an elastomeric tire tread and curing the said polyurethane reaction mixture to form an integral composite structure comprising an elastomeric tire tread having a cured polyurethane adhered to its recessed portion where the polyurethane reaction mixture comprises
   (a) a reactive hydrogen-containing polymeric material having a molecular weight between about 700 and 5000 selected from the group consisting of polyester polyols, polyether polyols, and hydroxy-terminated polymeric hydrocarbons
   (b) an organic polyisocyanate, the ratio of the organic polyisocyanate to the polymeric material being between 1.1/1 and 12/1, and
   (c) at least one curing agent selected from the group consisting of glycols, diamines having primary amino groups, diamines having secondary amino groups, dicarboxylic acids, hydroxy amines, hydroxy-carboxylic acids, and amino-carboxylic acids, in an amount of about 0.5 to 0.9 moles per mole of excess organic polyisocyanate over that equivalent to the reactive hydrogen-containing polymeric material.

2. The method according to claim 1 which comprises spray coating a liquid polyurethane reaction mixture on the surface of the recessed portion of an elastomeric tire tread, removing any excess of the reaction mixture from the outer portion of the tread and curing the said polyurethane reaction mixture at a temperature of from about 20° C. to about 150° C.

3. The method according to claim 1 which comprises the steps of cleaning the surface of the recessed portions of an elastomeric tire tread with a solvent cleaner, applying a coating of a liquid polyurethane reaction mixture to the cleaned surface of the recessed portion of the elastomeric tire tread and curing the said polyurethane reaction mixture to form an elastomeric tire tread having a cured polyurethane adhered to its recessed portion.

4. The method according to claim 1 where the reactive hydrogen containing polymeric material is a polyester polyol, the organic polyisocyanate is a diisocyanate and the curing agent is selected from diamines having primary amino groups and diamines having secondary amino groups.

5. The method according to claim 4 where the polyester polyol is derived from propylene glycol and adipic acid, the diisocyanate is selected from toluene diisocyanate, diphenylmethane-4,4'-diisocyanate and 3,3'-dimethyl-4,4'-bisphenylene diisocyanate, and the curing agent is selected from ethylene diamine, trimethylene diamine, tetramethylene diamine, m-phenylene diamine, o-dichlorobenzidine, m-dichlorobenzidine, 2,5-dichlorophenylene diamine, 3,3'-dichloro-4,4'-diamino-diphenyl methane, 4,4'-diamino-diphenyl methane and tolylene-2,4-diamine.

6. The method according to claim 4 where a bonding cement is applied to the recessed portion of the tread before applying an initial coating of the liquid reaction mixture.

7. The method according to claim 6 where the bonding cement is a solvent dispersion of an epoxy resin.

8. The method according to claim 1 where at least one side of the interior of the recessed portion is undercut.

9. The method according to claim 8 where the said recessed portion of the elastomeric tire tread is filled with the liquid polyurethane reaction mixture and the said reaction mixture is cured to form the integral composite structure.

10. The method according to claim 1 which comprises preparing a tire tread having as a portion of its exposed surface a cured polyurethane and a portion of its exposed surface as a cured rubber selected from natural rubber and synthetic rubber.

11. The method according to claim 10 wherein the synthetic rubber is selected from rubbery copolymers of butadiene and styrene, buty rubber, polyisoprene and polybutadiene.

References Cited

UNITED STATES PATENTS

| 3,261,646 | 7/1966 | Pax | 152—211 X |
| 3,382,120 | 5/1968 | Rudder | 156—293 X |
| 3,383,257 | 5/1968 | James | 156—74 |

HAROLD ANSHER, Primary Examiner

U.S. Cl. X.R.

152—209, 352; 156—293, 278; 161—190, 239, 247